(12) United States Patent
Baffes et al.

(10) Patent No.: US 7,389,430 B2
(45) Date of Patent: Jun. 17, 2008

(54) METHOD FOR PROVIDING ACCESS CONTROL TO SINGLE SIGN-ON COMPUTER NETWORKS

(75) Inventors: Paul T. Baffes, Austin, TX (US); John Michael Garrison, Austin, TX (US); Michael Gilfix, Austin, TX (US); Allan Hsu, Centerville, OH (US); Tyron Jerrod Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 10/313,708

(22) Filed: Dec. 5, 2002

(65) Prior Publication Data

US 2004/0111645 A1    Jun. 10, 2004

(51) Int. Cl.
*G06F 7/04* (2006.01)
*G06F 15/16* (2006.01)

(52) U.S. Cl. ............................ 713/202; 726/8; 709/229
(58) Field of Classification Search .............. 713/182; 726/8, 26; 709/229
See application file for complete search history.

(56) References Cited

U.S. PATENT DOCUMENTS

| | | | | |
|---|---|---|---|---|
| 5,113,442 A | * | 5/1992 | Moir | ........................ 713/167 |
| 5,276,444 A | * | 1/1994 | McNair | ...................... 340/5.8 |
| 5,335,346 A | * | 8/1994 | Fabbio | ...................... 711/163 |
| 5,375,244 A | | 12/1994 | McNair | |
| 5,510,777 A | * | 4/1996 | Pilc et al. | .................. 340/5.27 |

(Continued)

FOREIGN PATENT DOCUMENTS

WO    WO 00/54458    9/2000

OTHER PUBLICATIONS

Hochberg, J.; Jackson, K.; Stallings, C.; McClary, J.F.; Dubois, D.; Ford, J.;"*NADIR: An Automated System For Detecting Intrusion and Misuse*"; Computers & Security; May 1993, pp. 235-248; v12 n3.

Marin, J.; Ragsdale, D.; Sirdu, J.; "*A Hybrid Approach to the Profile Creation and Intrusion Detection*"; DARPA Information Survivability Conference & Exposition II, 2001; DISCEX '01; Proceedings, Jun. 12-14, 2001; vol. 1, 2001; pp. 69-76.

(Continued)

*Primary Examiner*—Nasser Moazzami
*Assistant Examiner*—Mohammad Reza
(74) *Attorney, Agent, or Firm*—Herman Rodriguez; Dillon & Yudell LLP

(57) ABSTRACT

A method for providing access control to a single sign-on computer network is disclosed. A user is assigned to multiple groups within a computer network. In response to an access request by the user, the computer network determines a group pass count based on a user profile of the user. The group pass count is a number of groups in which the access request meets all their access requirements. The computer network grants the access request if the group pass count is greater than a predetermined high group pass threshold value.

6 Claims, 2 Drawing Sheets

U.S. PATENT DOCUMENTS

| | | | |
|---|---|---|---|
| 5,621,889 A | | 4/1997 | Lermuzeaux et al. |
| 5,748,890 A | | 5/1998 | Goldberg et al. |
| 5,825,750 A | | 10/1998 | Thompson |
| 5,897,616 A | * | 4/1999 | Kanevsky et al. .......... 704/246 |
| 5,991,879 A | | 11/1999 | Still |
| 6,064,656 A | * | 5/2000 | Angal et al. ................ 370/254 |
| 6,088,451 A | | 7/2000 | He et al. |
| 6,115,709 A | * | 9/2000 | Gilmour et al. ................ 707/9 |
| 6,189,036 B1 | * | 2/2001 | Kao ........................... 709/229 |
| 6,192,361 B1 | * | 2/2001 | Huang ............................ 707/9 |
| 6,256,737 B1 | * | 7/2001 | Bianco et al. .............. 713/186 |
| 6,304,975 B1 | | 10/2001 | Shipley |
| 6,317,838 B1 | | 11/2001 | Baize |
| 6,334,121 B1 | | 12/2001 | Primeaux et al. |
| 6,839,680 B1 | * | 1/2005 | Liu et al. ...................... 705/10 |
| 7,219,234 B1 | * | 5/2007 | Ashland et al. ............. 713/182 |
| 2001/0027527 A1 | * | 10/2001 | Khidekel et al. ........... 713/201 |
| 2001/0039579 A1 | | 11/2001 | Trcka et al. |
| 2001/0039623 A1 | | 11/2001 | Ishikawa |
| 2002/0146018 A1 | * | 10/2002 | Kailamaki et al. .......... 370/401 |
| 2003/0093525 A1 | * | 5/2003 | Yeung et al. ............... 709/225 |

OTHER PUBLICATIONS

Buschkes, R.; Kesdogan, D.; Reichl, P.; "*How to Increase Security in Mobile Networks by Anomaly Detection*"; Computer Security Applications Conference, 1998, Proceedings; 14th Annual, Dec. 7-11, 1998; pp. 3-12.

Kokkinaki, A.I.; "*On a Typical Database Transactions: Identification of Probable Frauds Using Machine Learning for User Profiling*"; Knowledge and Data Engineering Exchange Workshop, 1997; Proceedings, Nov. 4, 1997; pp. 107-113.

Singh, H.; Furnell, S.; Lines, B.; Dowland, P.; "*Investigating and Evaluating Behavioural Profiling and Intrusion Detection Using Data Mining*"; Information Assurance in Computer Networks; Methods, Models and Architecture for Network Security; International Workshop MMM-ACNS 2001; Lecture Notes in Computer Science vol. 2052; May 21-23, 2001; pp. 153-158.

* cited by examiner

METHOD FOR PROVIDING ACCESS CONTROL TO SINGLE SIGN-ON COMPUTER NETWORKS

BACKGROUND OF THE INVENTION

1. Technical Field

The present invention relates to computer security in general, and in particular to a method for providing access control to computer networks. Still more particularly, the present invention relates to a method for providing access control to single sign-on computer networks.

2. Description of the Related Art

For a large institution, such as a corporation, university, etc., computer security has been primarily focused on stopping external threats. However, it is expected that more than 70% of all intrusions to a computer network within a large institution come from internal sources. In other words, the majority of the security threats to a computer network of a large institution comes from its own employees. Regardless of whether the intrusions to the computer network are intentional or not, such intrusions may end up costing the institution millions of dollars.

With external hackers, network administrators can use firewalls and/or other computer security tools to detect and stop intrusions to a computer network. But with internal "hackers," network administrators are left without any useful tools to combat the intrusion problem because firewalls and other computer security tools are ineffective when the attacker is already inside the institution. In addition, network administrators must be able to maintain a delicate balance between access control and ease of access to a computer network. To that goal, a single sign-on approach is designed to simplify the process of accessing to resources within a computer network while maintaining access control to the computer network. With a single sign-on computer network, an employee can authenticate himself/herself to use most, if not all, resources within the computer network by simply signing on to the computer network once instead of logging on to various resources, such as the mail server, file server, web server, etc., separately.

With the single sign-on approach, a network administrator still has to define access permissions for each employee to each resource within the computer network initially. Such practice is prohibitively tedious from a network management standpoint as well as from a usability standpoint. In order to reduce setup time, employees may be divided into groups for the purpose of granting network access permissions. However, every employee within an institution is typically unique, and it is not uncommon to grant special access permissions to each employee in order to allow for individual circumstances, which in essence defeats the benefit of grouping. Besides, group permissions tend to be very restrictive and often limit employees' ability to perform their job efficiently. Because the current method of providing access control to a single sign-on system is both limiting and inefficient, it would be desirable to furnish an improved method for providing access control to a single sign-on computer system.

SUMMARY OF THE INVENTION

In accordance with a preferred embodiment of the present invention, a user is assigned to multiple groups within a computer network. In response to an access request by the user, the computer network determines a group pass count based on a user profile of the user. The group pass count is a number of groups in which the access request meets all their access requirements. The computer network grants the access request if the group pass count is greater than a predetermined high group pass threshold value.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
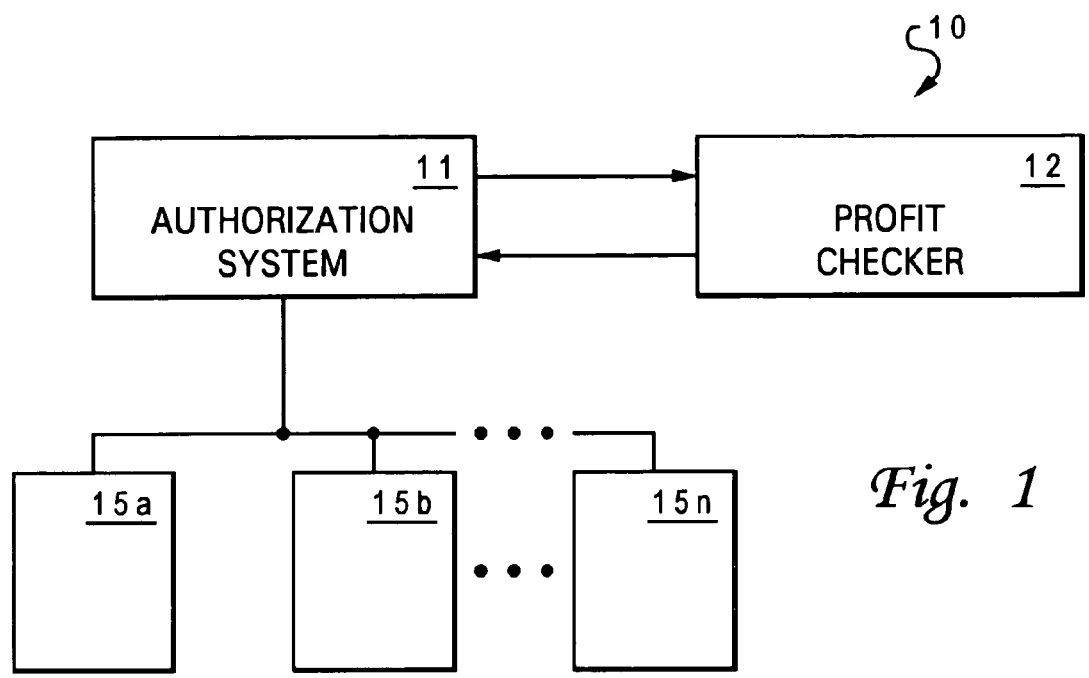
FIG. 1 is a block diagram of a computer network in which a preferred embodiment of the present invention is incorporated.

Referring now to the drawings and, in particular, to FIG. 1, there is depicted a block diagram of a computer network in which a preferred embodiment of the present invention is incorporated. As shown, a computer network 10 includes multiple computer systems 15a-15n coupled to an authorization system 11. Authorization system 11 allows for a single sign-on procedure to computer network 10. After receiving logon information (such as a username and a password) from a user, authorization system 11 makes sure that the user is authorized to access computer network 10 by making a call into a profile checker 12. If the result from profile checker 12 is positive, a session manager (not shown) within authorization system 11 then establishes a session for the user. Each time the user interacts with computer systems 15a-15n or requests access to a new resource within computer network 10, the session manager within authorization system 11 checks against its access controls by making a call into profile checker 12 to make sure the requested resource is not explicitly denied from the user.

Figure 2:
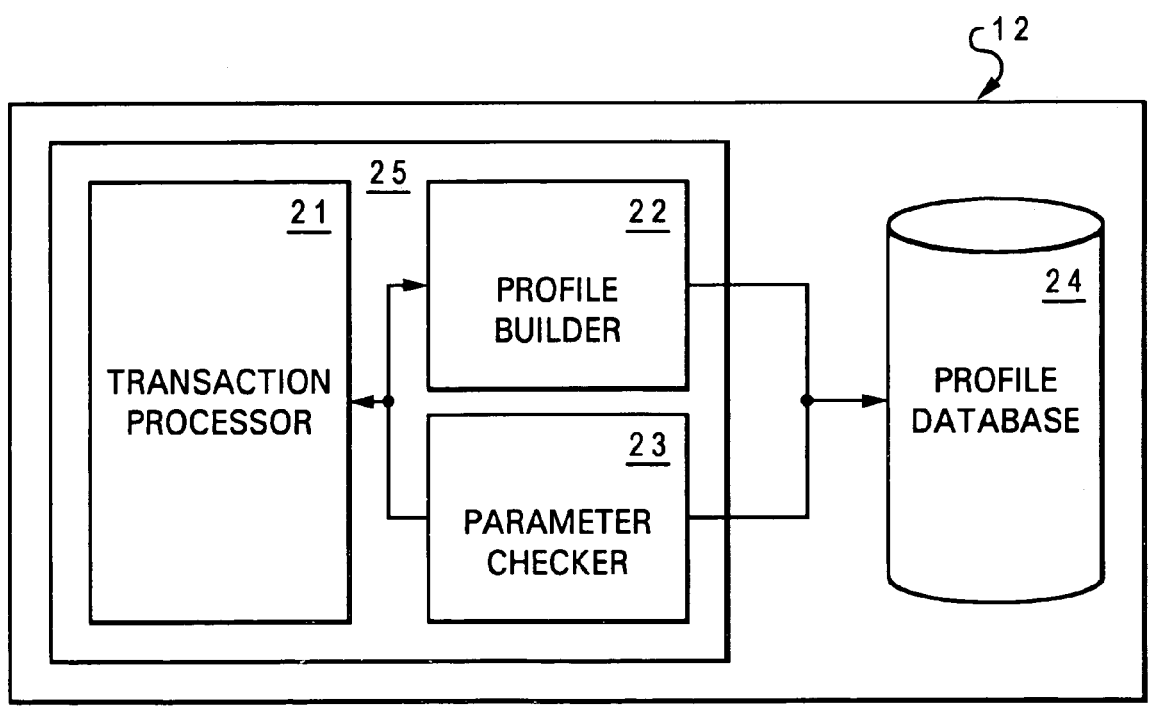
FIG. 2 is a detailed block diagram of a profile checker within the computer network from FIG. 1, in accordance with a preferred embodiment of the present invention.

With reference now to FIG. 2, there is depicted a detailed block diagram of profile checker 12, in accordance with a preferred embodiment of the present invention. As shown, profile checker 12 includes a profiling engine 25 coupled to a profile database 24. Profiling engine 25 includes a transaction processor 21, a profile builder 22, and a parameter checker 23. Upon receiving an access request, transaction processor 12 loads a user profile from profile database 24 in which group policies and user profiles are stored. Profile builder 22 may add information from an access request onto an existing user profile. Parameter checker 23 determines whether or not an access request violates certain predefined parameters based on the respective group policy and user profile.

In accordance with a preferred embodiment of the present invention, each user of computer network 10 is assigned to at least one group. Each group has a set of policies defining the parameters (or criteria) a user must meet in order to access any resource within the group. Policies may include parameters such as day of the week, time of day, resources being accessed, internet protocol (IP) address from which an access request is originated, port address from which an access request is originated, etc. In order for a group to serve an access request, the user profile of the user who initiates the access request must be able to meet a certain percentage of the parameters defined by the group.

In a large institution, each user most likely belongs to more than one group. Preferably, each user can be dynamically assigned to different groups. Because large institutions are generally complex in their organization, each user tends to have special requirements for his/her computing needs. Thus, a network administrator can have the option for the computer network to recommend groups with which a user should be associated. The dynamic group association can be accomplished by running user requests by each group in the computer network for a specific length of time. The computer network then keeps track of all the access requests each user had made and the groups in which access requests were granted. Based on an observation that certain groups are found to be more frequently requested and granted to a user, the association of those groups to that user will be recommended to the network administrator. As such, the network administrator can utilize the statistical information tracked by the computer system to make group assignment for an user automatically.

In addition, profile checker 12 develops a group profile for a group by tracking the actions of users in that group only. For example, a marketing group profile is formulated by users who belong to the marketing group only. Profile checker 12 also develops a user profile for each user by tracking all the activities of each user accordingly. By tracking multiple users across multiple groups within computer network 10, profile checker 12 can develop multiple levels of user profiles and group profiles.

Profile checker 12 monitors a user's request for access to any resource within computer network 10. After receiving an access request from a user, transaction processor 12 loads the user profile from profile database 24. Profile builder 22 adds the information from the access request onto the existing user profile. The access request is then passed through parameter checker 23 to determine if the access request violates certain predefined parameters. The result of a profile check simply states whether the access request is normal or abnormal. The result is subsequently passed back to the authorization system 11 (from FIG. 1).

If the result of the profile check states that the access request is normal, the access request is granted without any further actions. If the result of a profile check states that access request is abnormal, then various actions can take place. First, an alert is send to a network administrator (or to a database) to make sure someone is alerted of the abnormal behavior. Next, computer network 10 either denies the access request or grants the access request and tracks the access request. If computer network 10 denies the access request, the denial can either be for that particular resource only or for all resources within computer network 10, and the user is required to call the help desk to clear the denial. Although the user is given more rights in the alternative approach (i.e., monitoring all access requests made to any resource by the user after granting access to the user), an audit trail detailing all the affected components are generated, and such information can be used as evidence for prosecution if necessary.

For example, once a session manager within authorization system 11 (from FIG. 1) has authenticated a user, the session manager then checks to see if an access request from the user will be allowed based on the user profile. If the answer is yes, the session manager then grants the access request without any further action. If the answer is no, the session manager then sends a severity. The severity signifies how much the access request is deviated from the normal access pattern. If the deviation is severe enough, authorization system 11 will reject user access to all resources. If the deviation is not severe enough, authorization system 11 will deny access to that resource only. Instead of denying access to the resource, the other option is to send an alert to a network administrator to indicate that the usage pattern of the user is out of normal behavior. When the network administrator looks at the alert, he/she can then pull up all the actions the user had performed since the alert.

Figure 3:
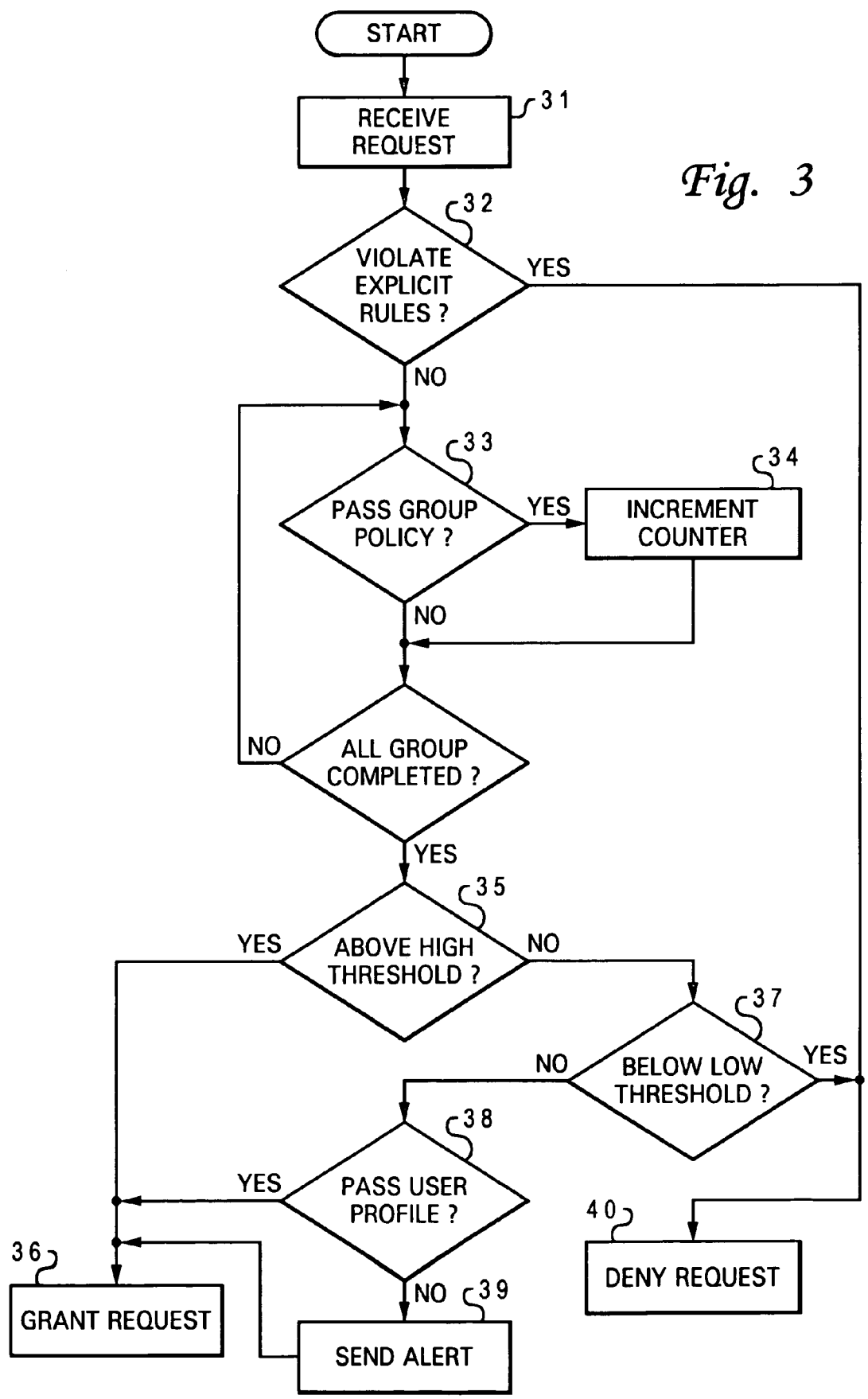
FIG. 3 is a high-level logic flow diagram of a method for providing access control to a single sign-on computer network, in accordance with a preferred embodiment of the present invention.

Referring now to FIG. 3, there is illustrated a high-level logic flow diagram of a method for providing access control to a single sign-on computer network, in accordance with a preferred embodiment of the present invention. After receiving an access request from a user, as shown in block 31, a determination is made as to whether or not the request violates certain access rules that are explicitly defined by a network administrator, as depicted in block 32. If the request violates the explicit access rules, the request is denied and an alert is raised, as shown in block 40. If the request does not violate the explicit access rules, then, for each group that is associated with (or assigned to) the user, a determination is made as to whether or not the user profile of the user meets the access requirements of that group, as shown in block 33. If the user profile of the user meets the access requirements of that group, a counter for keeping track of a group pass count is incremented, as depicted in block 34.

After all the groups to which the user belongs have been checked, a determination is made as to whether or not the group pass count is greater than a high group pass threshold, as shown in block 35. If the group pass count is greater than the high group pass threshold, the request is granted, as depicted in block 36. If the pass count is smaller than the high group pass threshold, then another determination is made as to whether or not the group pass count is less than a low group pass threshold, as shown in block 37. If the pass count is less than the low group pass threshold, then the request is denied and an alert is raised, as shown in block 40. However, if the group pass count is greater than the low group pass threshold, then the request is checked against the user profile, as depicted in block 38. If the request is within normal parameters of the user profile, the request is granted, as shown in block 36. Otherwise, if the request violates the user profile, then an alert is sent to the network administrator, as depicted in block 38, but the request is still granted, as shown in block 36.

As has been described, the present invention provides an improved method for providing access control to single sign-on computer networks. With the present invention, a network administrator can set up access controls to all resources within a computer network as easy as one. The present invention allows an user to access all resources not strictly prohibited.

Based on the choice of the network administrator, the group policy of a computer network can be refined by adding or removing specific parameters from profiles. With the present invention, user profiles and group profiles are highly dynamic to adapt to each user's needs. Over time, the computer network can build a more comprehensive understanding of each user's actions and such understanding can be improved over time to become a so-called normal access pattern. A denial of access to a user should occur only when the user deviates too much from his/her normal access pattern.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing access control to a single sign-on computer network, said method comprising:
   associating a user to a plurality of groups, wherein each of said plurality of groups has a set of policy defined parameters utilized to grant the user access to network resources, said associating a user to a plurality of groups comprising:
   tracking access requests granted to said user; and
   associating the user with one or more groups in accordance with the frequency with which the one or more groups are utilized to grant the access requests;
   in response to an access request by said user, determining a group pass count based on a user profile of said user, wherein said group pass count is a number of said plurality of groups having access requirements that are met by said user profile; and
   granting said access request if said group pass count is greater than a predetermined high group pass threshold value.

2. The method of claim 1, wherein said method further includes denying said access request if said group pass count is lower than a predetermined low group pass threshold value.

3. The method of claim 2, wherein said method further includes sending a severity to a network administrator based on a level of deviation from normal access after denying said access request.

4. The method of claim 1, wherein said method further includes checking whether or not said access request is within normal parameters as defined in said user profile in response to said group pass count being higher than a predetermined low group pass threshold value but lower than said predetermined high group pass threshold value.

5. The method of claim 4, wherein said method further includes granting said access request if said access request is within normal parameters as defined in said user profile.

6. The method of claim 4, wherein said method further includes sending an alert before granting said access request if said access request is not within normal parameters as defined in said user profile.

* * * * *